(No Model.) 15 Sheets—Sheet 3.
F. E. D. ACLAND & C. HOLMSTRÖM.
GUN.
No. 472,244. Patented Apr. 5, 1892.
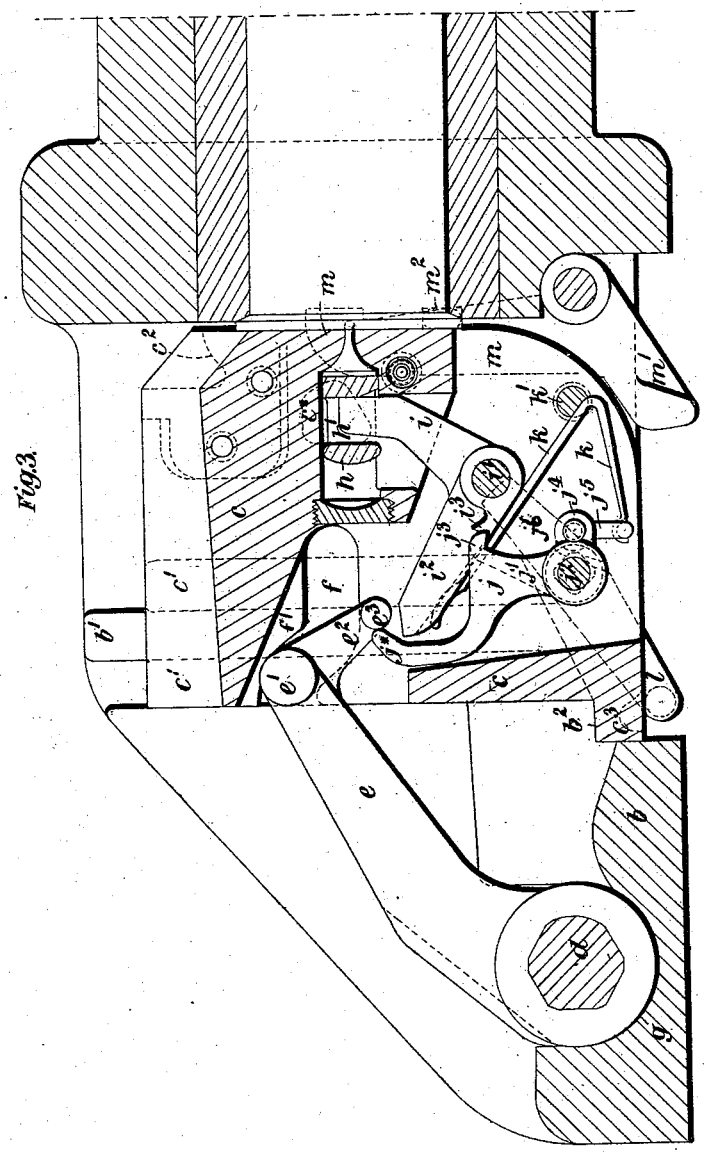
Witnesses:
Raphael Netter
Ernest Hopkinson
Inventors
Francis E. D. Acland
Carl Holmström
by Duncan & Page
Attorneys.

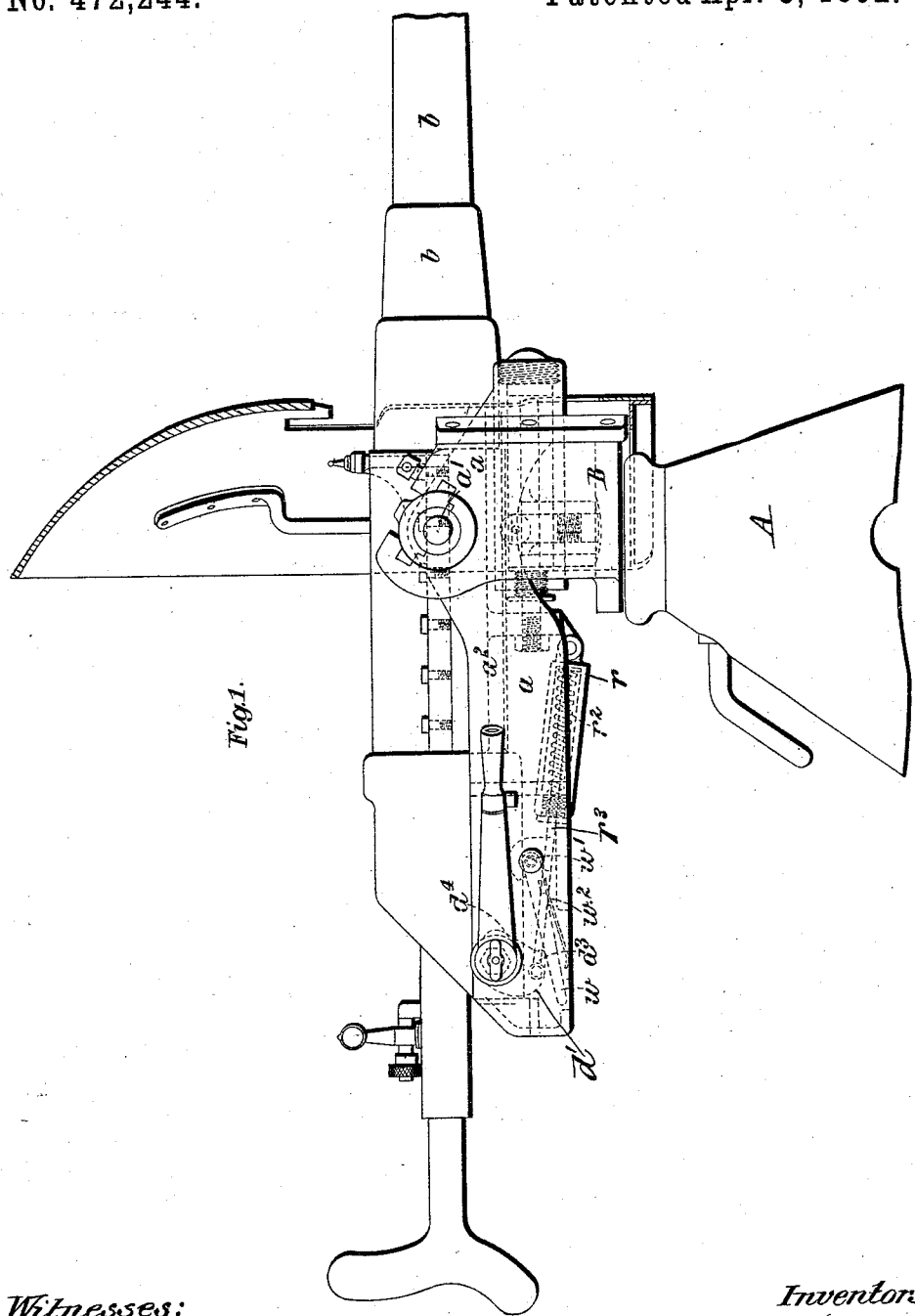

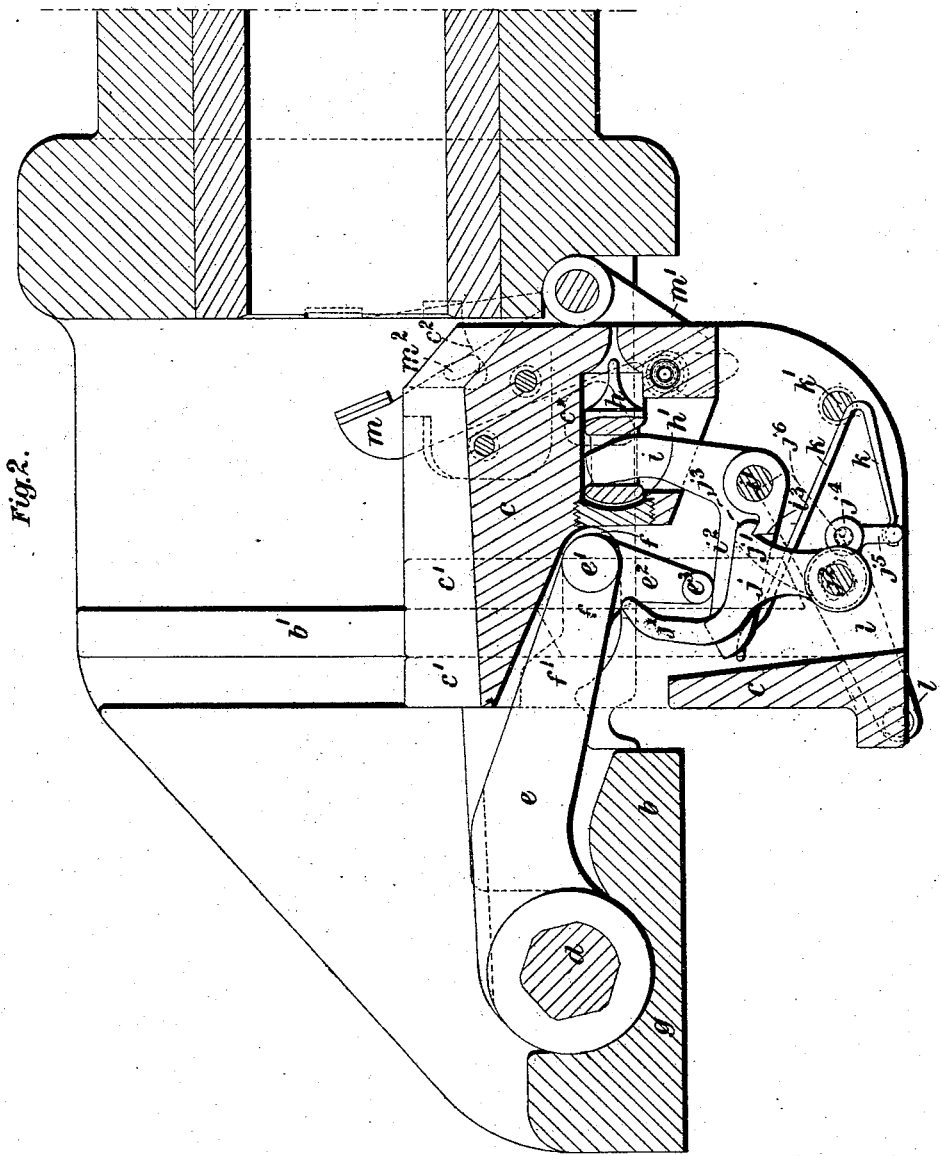

(No Model.) 15 Sheets—Sheet 4.
F. E. D. ACLAND & C. HOLMSTRÖM.
GUN.
No. 472,244. Patented Apr. 5, 1892.
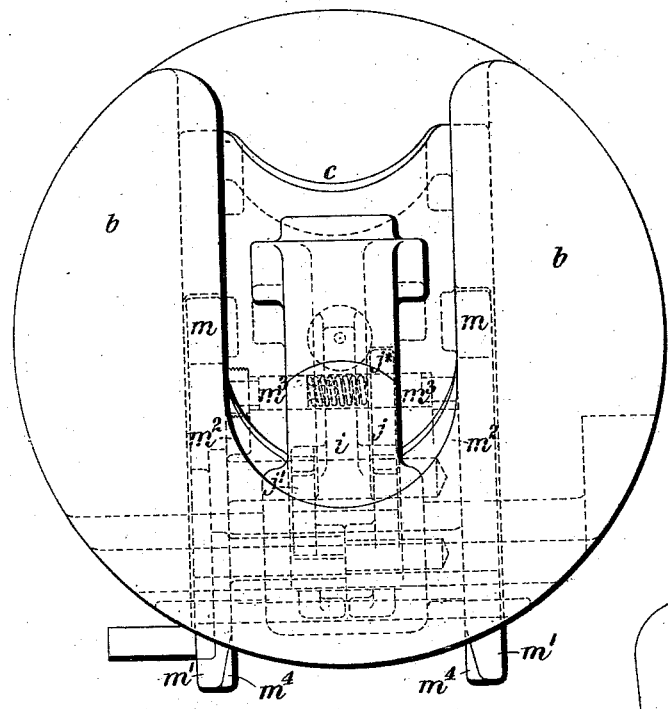
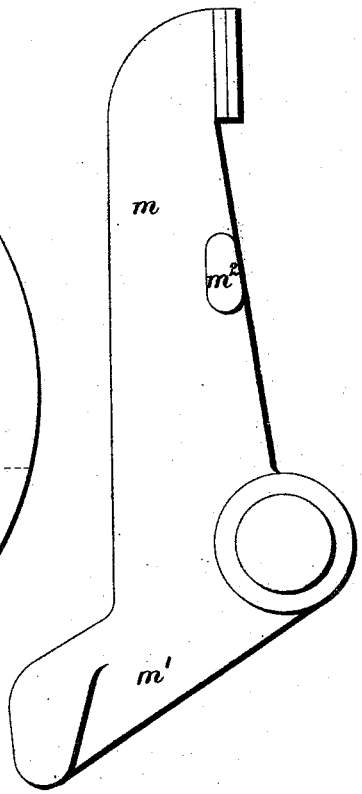

(No Model.) 15 Sheets—Sheet 5.

F. E. D. ACLAND & C. HOLMSTRÖM.
GUN.

No. 472,244. Patented Apr. 5, 1892.

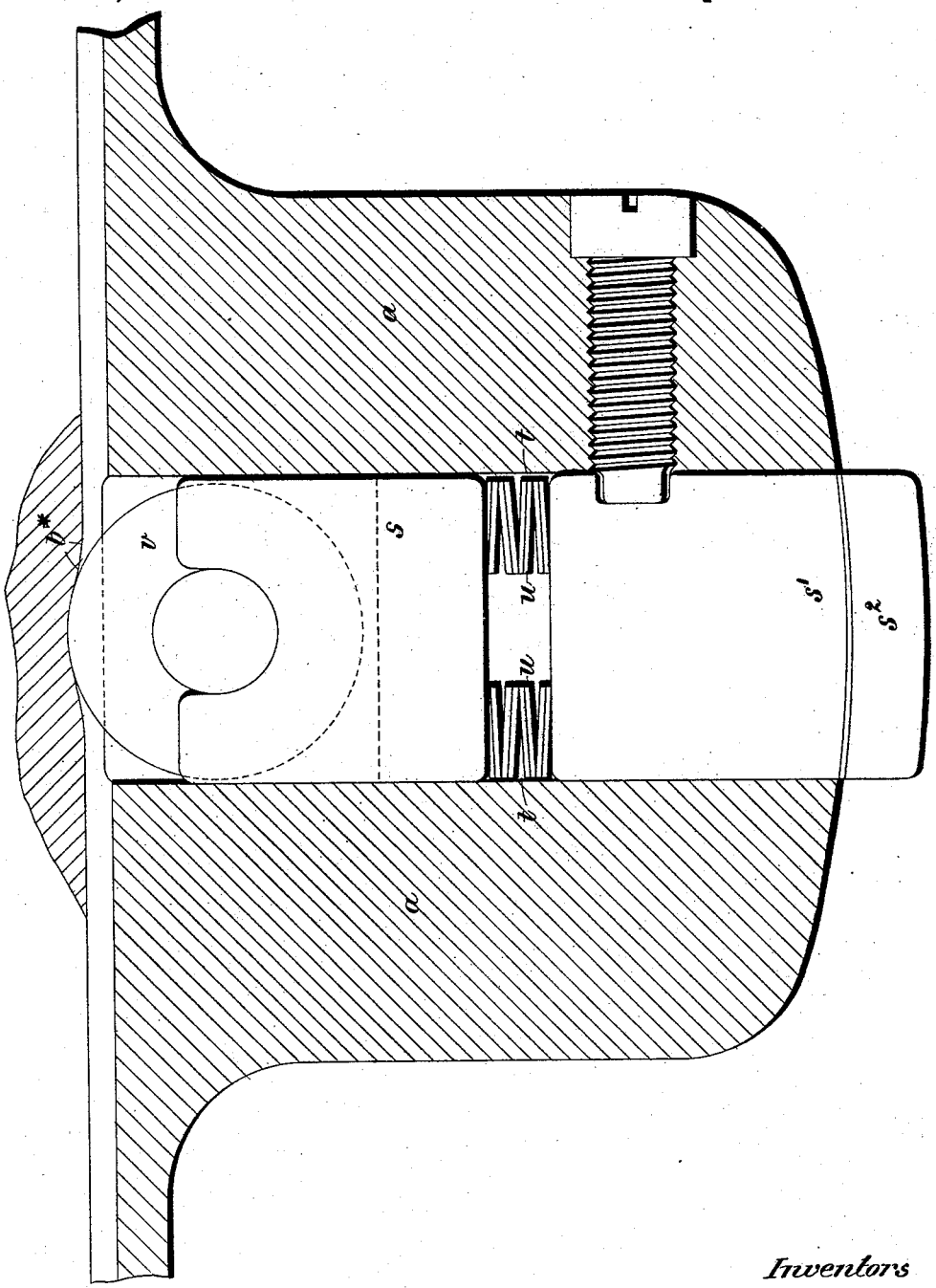

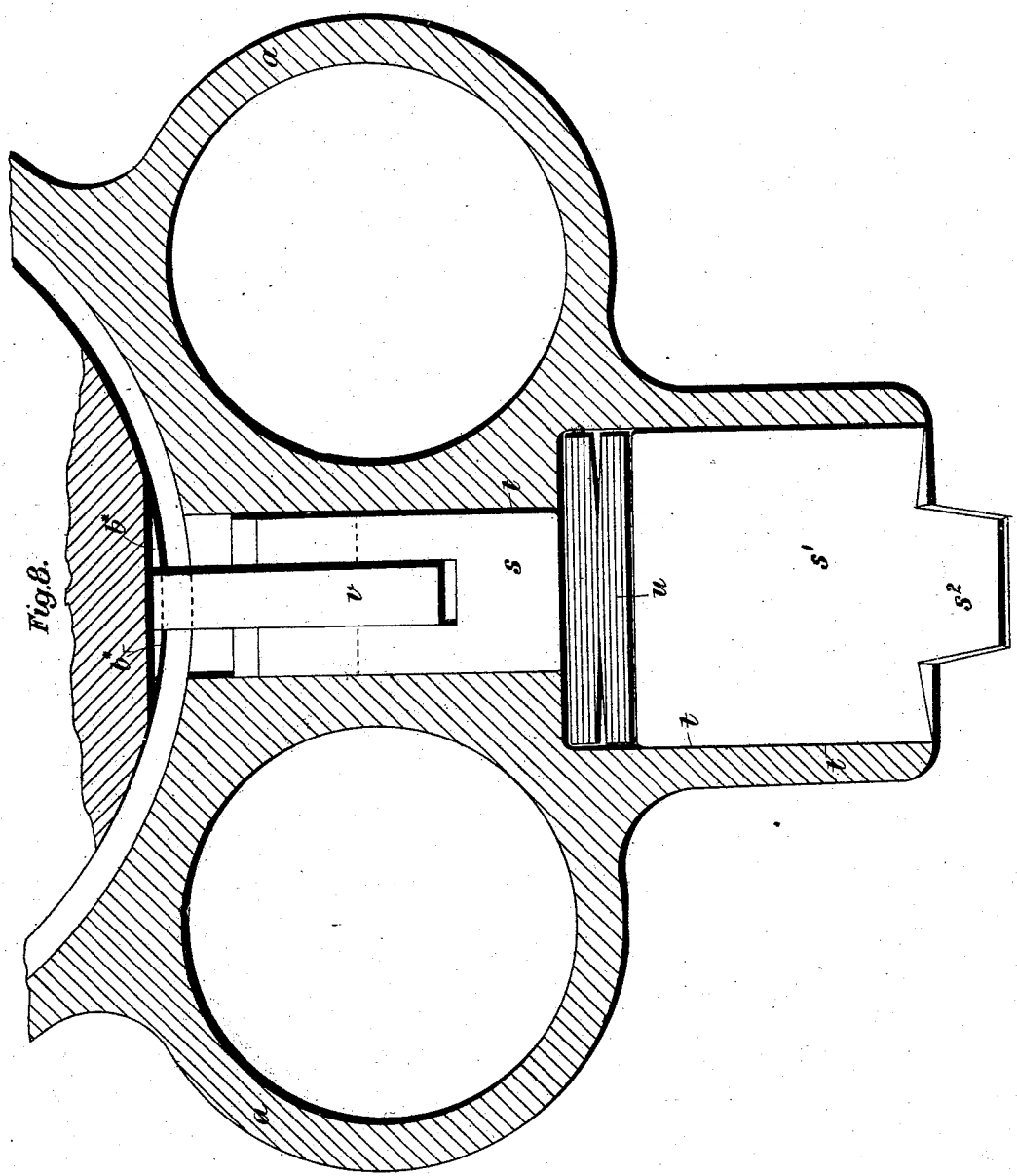

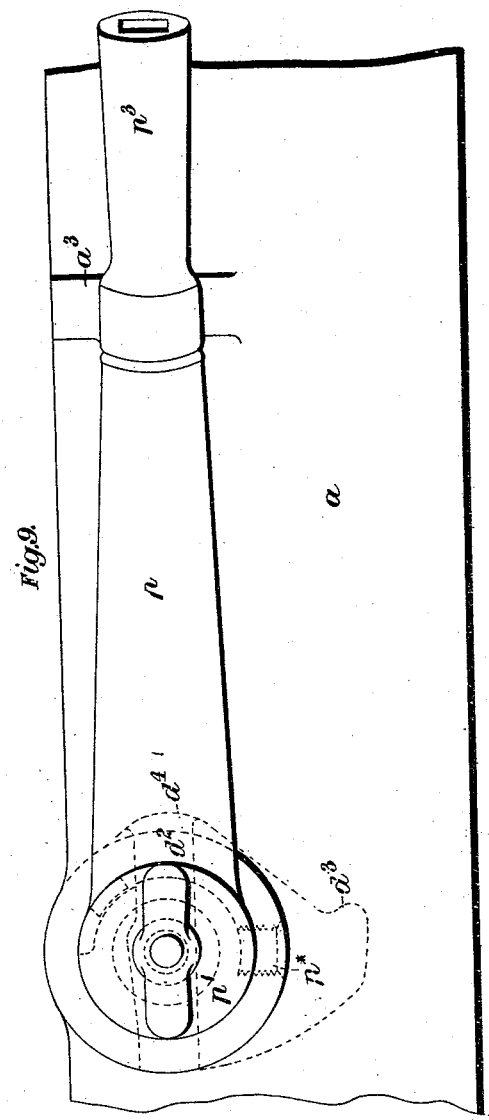

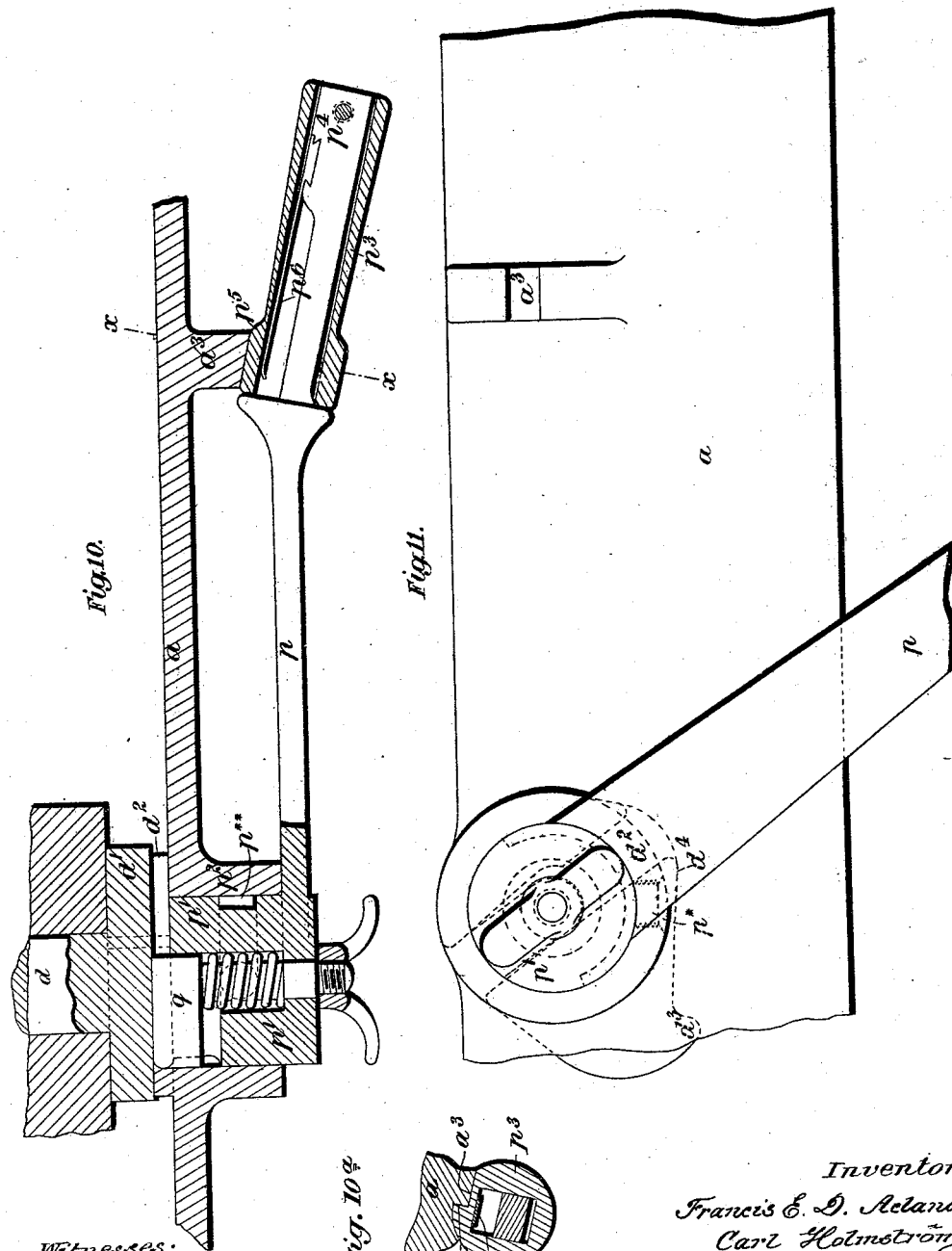

(No Model.) 15 Sheets—Sheet 10.
F. E. D. ACLAND & C. HOLMSTRÖM.
GUN.
No. 472,244. Patented Apr. 5, 1892.
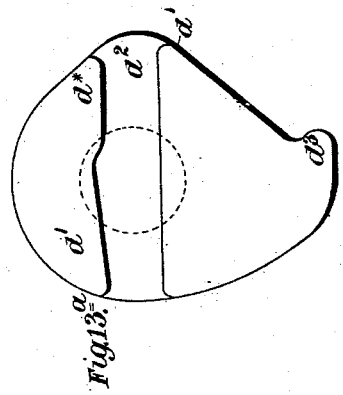
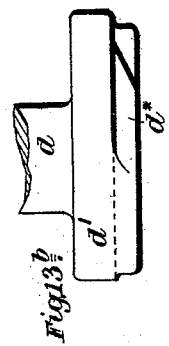
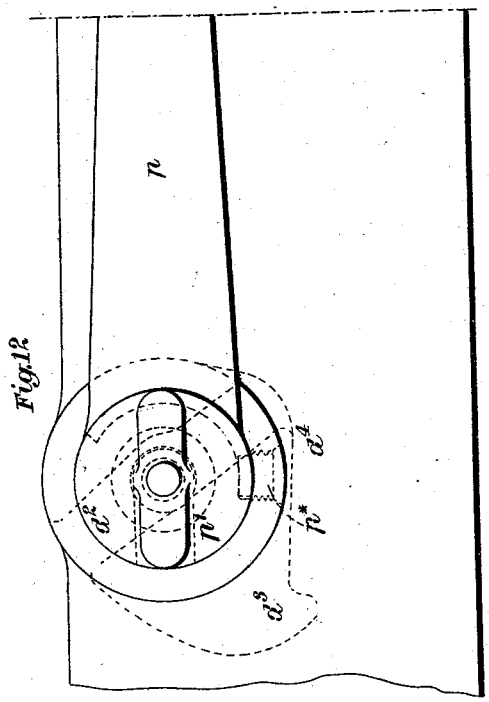
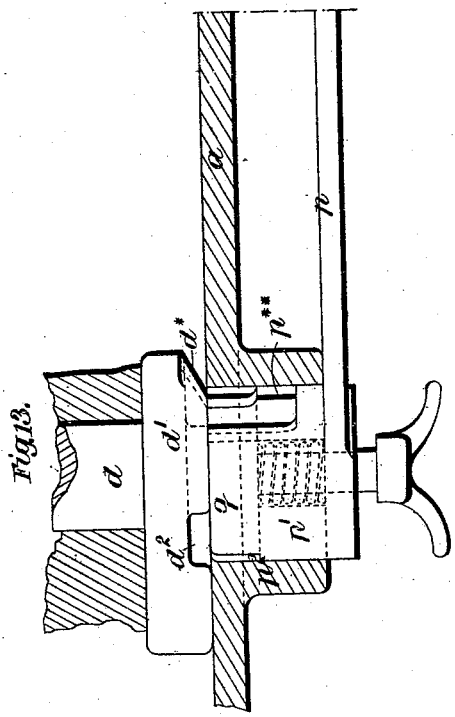
Witnesses:
Raphaël Netter
Ernest Hopkinson
Inventors
Francis E. D. Acland,
Carl Holmström
by Duncan Page
Attorneys.

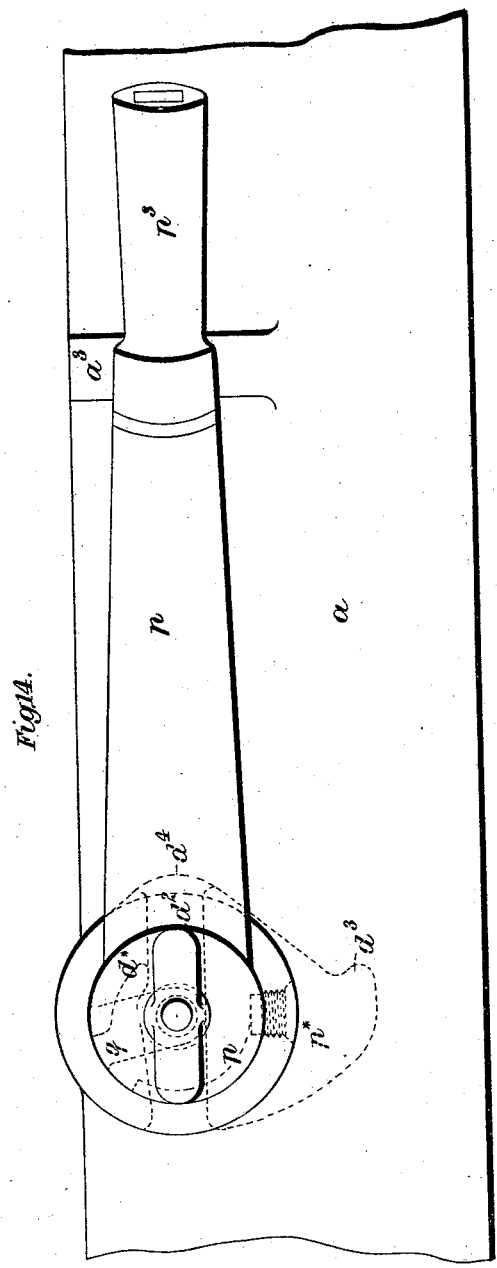

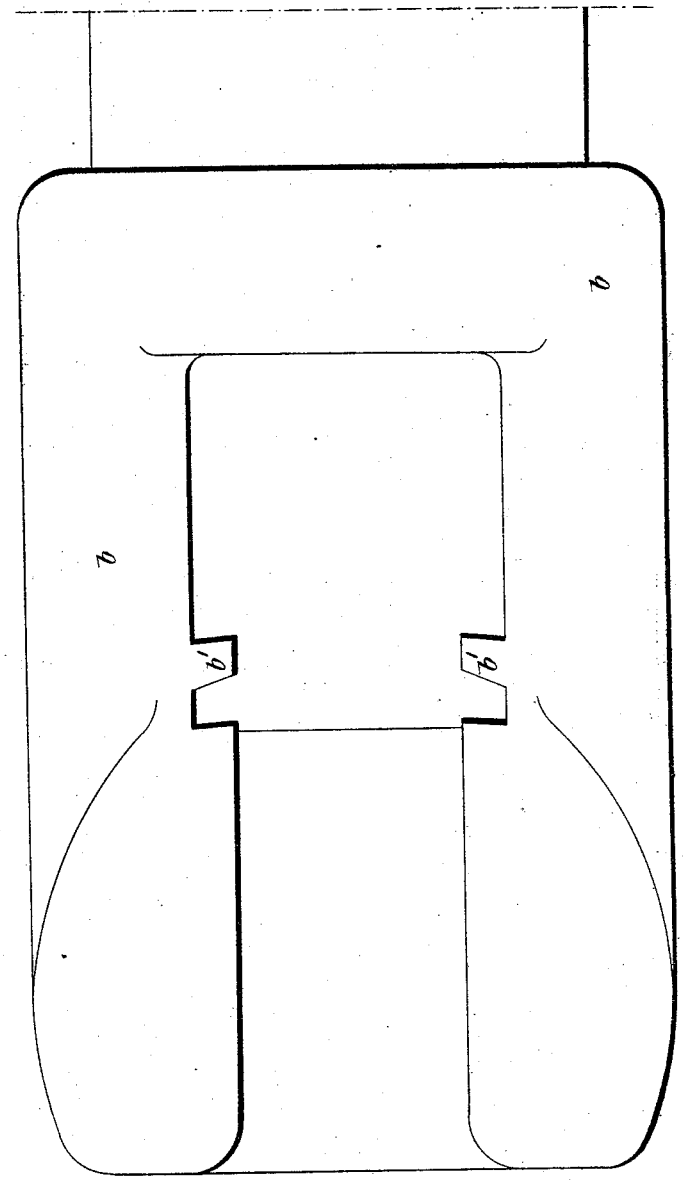

(No Model.) 15 Sheets—Sheet 13.
F. E. D. ACLAND & C. HOLMSTRÖM.
GUN.
No. 472,244. Patented Apr. 5, 1892.
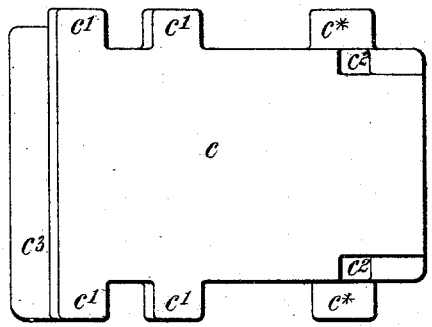
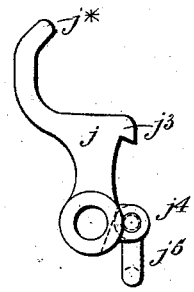 
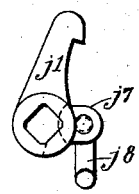 
Witnesses:
Raphael Netter
Ernest Hopkinson
Inventors:
Francis E. D. Acland
and Carl Holmström
by Duncan & Page
Attorneys (No Model.) 15 Sheets—Sheet 14.
F. E. D. ACLAND & C. HOLMSTRÖM.
GUN.
No. 472,244. Patented Apr. 5, 1892.
Fig. 23.
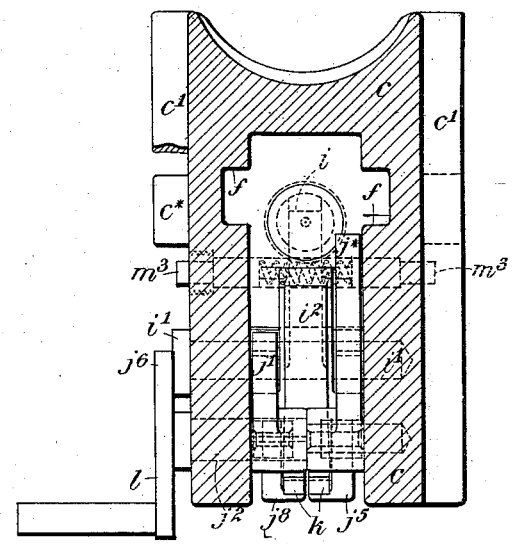
Fig. 24.
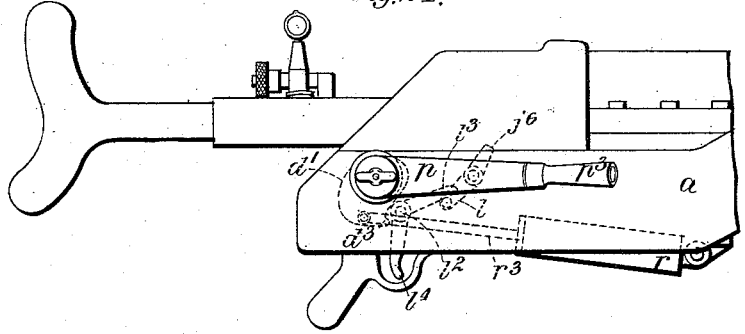
Fig. 17.
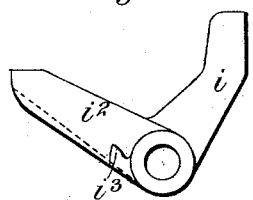
Fig. 18.
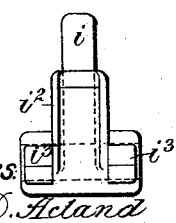

(No Model.) 15 Sheets—Sheet 15.
F. E. D. ACLAND & C. HOLMSTRÖM.
GUN.

No. 472,244. Patented Apr. 5, 1892.

Witnesses:
Raphaël Netter
M. G. Tracy.

Inventors:
Francis E. D. Acland &
Carl Holmström
by Duncan & Page.
Attorneys

UNITED STATES PATENT OFFICE.

FRANCIS EDWARD DYKE ACLAND AND CARL HOLMSTRÖM, OF LONDON, ENGLAND.

GUN.

SPECIFICATION forming part of Letters Patent No. 472,244, dated April 5, 1892.

Application filed March 25, 1891. Serial No. 383,403. (No model.)

*To all whom it may concern:*

Be it known that we, FRANCIS EDWARD DYKE ACLAND, late captain Royal Artillery, a subject of the Queen of Great Britain, and CARL HOLMSTRÖM, engineer, a subject of the King of Sweden and Norway, both residents of London, England, have invented certain new and useful Improvements in and Relating to Quick-Firing Guns, of which the following is a specification, reference being had to the accompanying drawings.

Our invention relates to quick-firing guns of that class wherein the breech is closed by a block or wedge arranged to slide across the end of the bore and wherein the breech mechanism is so arranged that the breech can be opened automatically by force derived from the recoil of the gun, and comprises improvements whereby we are enabled to make a gun circular in transverse section throughout its length and to dispense with lugs or other projections upon the body of the gun for supporting parts of the breech mechanism.

Our said invention, moreover, comprises other improvements hereinafter described.

Our improvements are illustrated in the accompanying drawings, in which—

Figure 6:
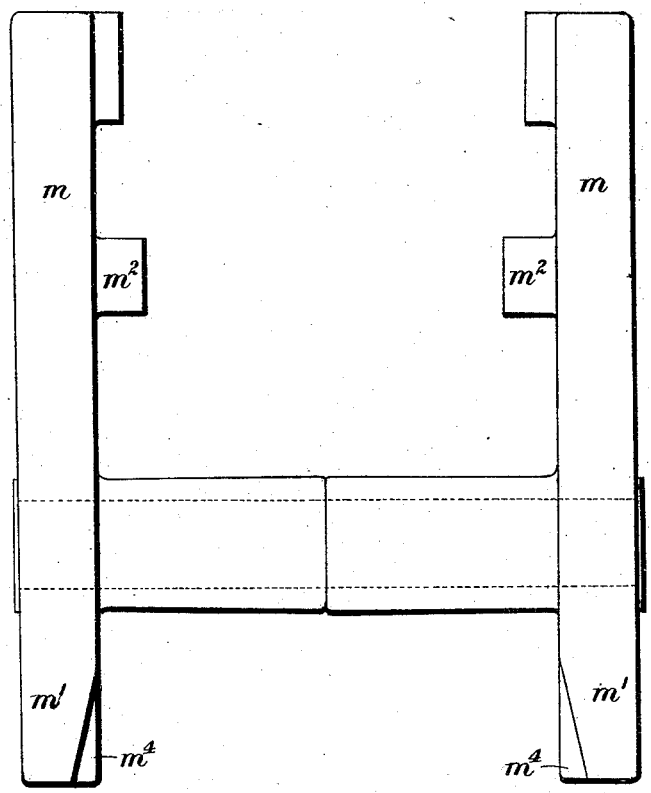
Figure 25:
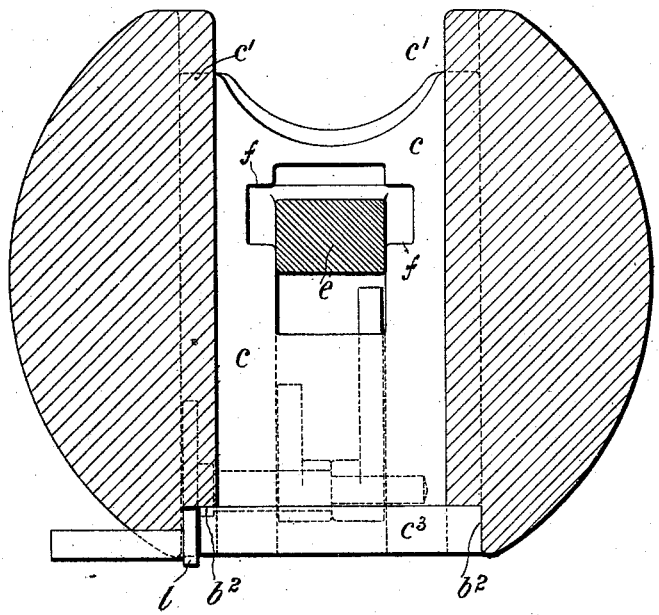

Figure 1 is a side elevation of a gun constructed according to our invention. Fig. 2 is a central longitudinal section showing the breech mechanism of the said gun with the breech open. Fig. 3 is a similar section showing the breech closed. Fig. 4 is a rear end view of the breech. Figs. 5 and 6 show side and rear views of the extractor. Figs. 7 and 8 are longitudinal and transverse sections illustrating the construction and arrangement of an automatic brake forming part of our improvements. Figs. 9 to 14 illustrate the arrangement of the hand-lever hereinafter described, in combination with the crank-shaft in our improved gun. Figs. 15 to 24 are views showing details hereinafter described. Fig. 25 is a vertical sectional view on line $x^2\ x^2$ of Fig. 3.

Like letters indicate the same parts throughout the drawings.

A is a strong elastic stand or support. B is a frame or cross-head mounted to swivel thereon.

$a$ is a cradle constructed with two sides or cheeks provided with trunnions $a'$, which rest in suitable bearings in the said frame or cross-head.

$b$ is the gun proper or gun-body, which is circular in transverse section in all parts—that is to say, it is made without the usual square or rectangular breech portion and without having formed on it any lugs or projections for the attachment of parts of the breech mechanism. Therefore the said gun can be very easily forged and finished. The gun $b$ is supported by guide-grooves $a^2$ in the cheeks of the cradle $a$ and slides to and fro in the same in the recoil and return movements.

$c$ is the breech-block.

$d$ is the crank-shaft, and $e$ is an arm or lever fixed thereon for operating the breech-block.

The breech-block $c$ is formed as shown in Figs. 2, 3, and 4, and opens and closes the breech by moving in the aperture or cavity formed for its reception in the body of the gun. For guiding the breech-block in its movements for opening and closing the breech we construct the said block with one or more suitable guiding-ribs $c'$ on each side thereof, (see Fig. 16,) and we form the gun with similar ribs $b'$, which work between those of the breech-block $c$, as shown in Fig. 15. We make the forward surfaces of the ribs $c'$ beveled or inclined and their rear surfaces very slightly inclined or undercut, and make the corresponding surfaces of the grooves in which the said ribs $c'$ slide of like form, as shown. We form the bearing-surfaces in this manner in order to obtain great resistance to shearing-stresses, while making the breech-block as short as practicable, and also in order that the breech-block, by reason of the fitting of the slightly-undercut rear surfaces of the ribs to the slightly-undercut grooves, may tend to hold the sides of the breech chamber or cavity together when the force of the explosion comes upon the breech-block.

The crank-shaft $d$ for operating the breech-block to open and close the breech is arranged in bearings in the body of the gun behind the chamber or cavity in which the breech-block slides, as clearly shown in Figs. 2 and 3. The crank arm or lever $e$ is provided with pins or projections $e'$, which work in grooves $f$ in the breech-block, these grooves being, by preference, made with a portion $f'$ concentric with the crank-shaft $d$ when the breech is closed, so that the said crank-arm will, after raising the breech, move into the position shown in Fig. 3. The crank-arm, moreover, has a short portion at $e^2$ bent at a right angle to its main portion and provided with a pin or stud $e^3$. The said portion $e^2$ of the crank-arm acts on the tail of the firing-hammer to draw back the firing-pin in the descent of the breech-block, and which serves a further purpose hereinafter described. The said crank arm or lever $e$, being situated behind the breech-block, is utilized as a strut for assisting to support the said block against the force due to the explosion in the barrel. To provide for the efficient support of the said arm or lever for this purpose, a bearing for the boss or hub of the said lever is in some instances formed at $g$ in the body of the gun. The crank arm or lever $e$ and the breech-block $c$ are preferably so constructed and arranged that when the breech is open the said lever and the upper part of the breech-block will serve as a loading-tray, upon which the cartridges may be placed and from which they may be slid into the chamber of the gun.

The breech-block $c$ carries the firing-hammer, (shown separately in side and end elevation in Figs. 17 and 18, respectively,) one extremity of which projects into a slot $h'$ in the firing-pin.

$j$ is a sear, (shown separately in side and rear elevation in Figs. 19 and 20, respectively.)

$j'$ is an auxiliary sear, (shown separately in side and rear elevation in Figs. 21 and 22, respectively.)

$k$ is the mainspring, which is supported by the pin $k'$.

$l$ is the trigger, and $m$ is the extractor. The said extractor is arranged to be actuated by the breech-block in the descent to throw out the cartridge and to hold the said breech-block open until released by the insertion of a fresh cartridge in the chamber of the gun.

The sear $j$ is fitted to turn freely on a round portion of the trigger pivot-pin $j^2$, and therefore turns without moving the said pivot-pin and cannot be actuated by the trigger, but, as hereinafter described, can be attached by the lever $e$. The sear $j'$ is fixed on a square portion of the pivot-pin, so that it can be actuated by the trigger.

It will be seen that the sear $j$ has an extension $j^*$, which lies behind the pin or stud $e^3$ on the crank-arm in such a position that as the crank-arm rises the pin $e^3$ will act on the part $j^*$ of the sear and withdraw the sear from the hook of the firing-hammer, so that if by means of the trigger the auxiliary sear $j'$ is also being held out of engagement with the hammer the gun will be fired; but if when the sear $j$ is pulled back by the rising of the lever $e$ the other sear $j'$ remains engaged with the hammer the gun will not be fired and the firing cannot take place till the trigger is pulled.

In the downward movement of the lever $e$ when opening the breech the arm $e^2$ acts upon the tail-piece $i^2$ of the striking-hammer and effects the cocking of the same. Moreover, should the sear-hooks be broken from any cause the gun cannot be fired until the breech-block is pressed home, because in any other position of the breech-block the tail-piece $i^2$ of the striking-hammer would encounter the portion $e^2$ of the crank-arm and thereby be prevented from acting.

Our said invention, moreover, comprises improvements whereby we obviate any liability to accidental release of the breech-block $c$ when open by disengagement of the extractor $m$ therefrom before the cartridge is fully inserted into the chamber of the gun. It has heretofore been usual to form the extractor with two claws to act on the rim of the cartridge in the extraction of the same and to construct the claws in one piece, so that neither can move independently of the other. Consequently if in the insertion of a cartridge it should be by accident or want of care pushed forward somewhat obliquely, so that the point or side of the projectile strikes one of the claws, the extractor will be disengaged from the breech-block, and the latter will rise before the cartridge is pushed home; but by our invention we prevent all danger from this cause of the premature rising of the breech-block and the consequent jamming of the cartridge between the body of the gun and the upper end of the said breech-block. For this purpose we make the said extractor double, or in two similar separate parts. These parts are mounted so that they can turn independently of each other about their pivot or axis. They are, however, operated simultaneously in the downward movement of the breech-block, to effect the extraction of the empty cartridge-case. For this purpose each side of the block $c$ is provided with a projection $c^*$, arranged to strike the lower arm or tail $m'$ of the extractor in the descent of the breech-block. The upper arm of each part of the extractor is formed with a projection or hook $m^2$, adapted to engage with a notch $c^2$ in the breech-block when the same is in the loading position for the purpose of restraining the said block in this position till a fresh cartridge has been properly inserted in the gun. In the insertion of a cartridge if the same moves forward in line with the gun's axis the projectile and body of the cartridge will pass freely between the two claws until the flange or rim thereof strikes the said claws, the cartridge being then pushed home and the projections on the extractor being disengaged from the breech-block, thus permitting the ascent of the said block under the action of its spring or springs; but should the cartridge be placed or moved forward obliquely or out of line with the gun's axis, so that the projectile or forward end of the cartridge, instead of passing freely between the claws of the extractor to the gun, engages with one claw only, thereby disengaging one part of the extractor from the breech-block, the other part of the said extractor, not being disengaged, will prevent the premature ascent of the breech-block and the consequent jamming of the cartridge. A serious cause of inconvenience such as we have described is the liability of the extractor to be thrown forward by concussion or vibration before the block has risen to the loading position after opening the breech. To prevent this, we provide the breech-block with spring friction-pistons $m^3$, Figs. 3, 4, and 23, which, when the block is down in its lowest position, bear upon the faces of inclines $m^4$ at the lower extremities of the two parts of the extractor and prevent the accidental movement of the said extractor. When the breech-block, after having thrown back the extractor, rises again to the loading position shown in Fig. 2, the said friction-pistons slide off the inclines $m^4$, and the extractors then become locked by the engagement of the projections or hooks $m^2$ with the notches $c^2$.

The breech-block $c$ is preferably provided with a rearward extension or flange $c^3$, which, when the breech is closed, beds in a recess $b^2$, formed in the body of the breech, and limits the upward movement of the breech-block. (See Figs. 2, 3, and 25.)

We mount the firing-hammer $i$ upon a suitable pivot-pin $i'$, which is inserted and secured in the breech-block, and we make the said hammer with an arm $i^2$, arranged to be acted upon by the nose of the portion $e^2$ of the crank-arm. The sear $j$ has a hooked end $j^3$, adapted to engage with a projection $i^3$ on the said hammer for the purpose of retaining the same in its cocked position. The said sear $j$ has, moreover, a short arm $j^4$, which by a link $j^5$ is connected to and acted on by the main-spring $k$, the other end of which spring acts upon the arm $i^2$ of the firing-hammer. Moreover, the sear $j'$ has a short arm $j^7$ and link $j^8$, (see Fig. 21,) similar to the arm and link $j^4$ and $j^5$ of the sear $j$, and the spring $k$ also engages with the said link $j^8$. The said spring therefore serves to operate both the firing-hammer and the sears.

We provide the following means, as shown in Figs. 2, 3, and 23, for retaining the pivot-pin $i'$ of the firing-hammer in its place—that is to say, we fix on the pivot-pin $j^2$ of the sear an arm $j^6$, that projects over the head or end of the pivot-pin $i'$ and prevents the displacement of the latter, and the said pin $i'$ can only be taken out after the arm $j^6$ has been removed.

The pivot-pin $j^2$ of the sear has formed or fixed thereon the trigger $l$, by means of which the gun can be fired. For retaining the pivot-pin $j^2$ in place in the breech-block we prefer to make the aforesaid link $j^5$ in such a manner that when it is in its normal position a heel or tail piece thereon will engage with a notch or groove in the square portion of the said pivot-pin. When, however, the main-spring is removed, the said link can be turned about the joint-pin, which connects it to the sear $j$, and can thus be disengaged from the notch or groove in the pivot-pin. The said pivot-pin can then be drawn out endwise through the side of the block. The main-spring, therefore, in addition to actuating the firing-hammer and sears, also serves to retain in their proper positions the locking devices which secure the aforesaid pivot-pins in the breech-block.

For firing the gun automatically a bell-crank lever is provided, centered upon the gun at $l^2$ (see Fig. 24) and normally lying so that the end of its upper arm $l^3$ lies just above and clear of the crank-pin of the trigger $l$ when the breech-block is closed. The gunner, by placing his finger on the end of the lower arm $l^4$ of the bell-crank lever, may turn the same and cause the upper arm to act upon the trigger $l$ while the breech-block is rising, so as to release the auxiliary sear $j'$ at the moment the breech is closed.

For effecting the opening and closing of the breech by hand we provide a suitable hand-lever. In quick-firing guns it has been hitherto usual to fix the said lever on the crank-shaft. Therefore the said handle moves to and fro with the gun in its recoil and return. We can, if so desired, arrange the handle of our gun in like manner; but as the movement of the lever with the gun is attended with inconvenience and danger we prefer to arrange the same as follows—that is to say, the hand-lever is carried by the gun frame or cradle and does not move with the gun in its recoil and return. Therefore, as the said hand-lever is the medium for operating the crank-shaft in opening and closing the breech by hand we have to provide for its alternate connection with and disconnection from the said shaft, so that when the gun recoils in the cradle the shaft, which is normally in connection with the lever, will be disconnected therefrom; but when the gun is run out after recoiling the said lever will return into engagement with the said shaft and can then be used for turning the same to open or close the breech. We thus obviate the inconveniences which arise in cases where the hand-lever moved with the gun in the recoil. For carrying this part of our invention into practice we employ the apparatus illustrated in Figs. 9 to 14.

Figs. 9 and 10 show a side view and horizontal section with the parts in the position they occupy when the breech is closed. Fig. 10$^a$ is a section on the line $x\,x$, Fig. 10. Fig. 11 is a side view showing the hand-lever turned down to open the breech. Figs. 12 and 13 show a side view and horizontal section with the parts in the position they occupy when the gun has run out after recoil and the breech has been automatically opened. Figs. 13$^a$ and 13$^b$ show details hereinafter described. Fig. 14 is a side view illustrating a modification of the said apparatus.

We fit the boss $p'$ of the hand-lever $p$ in a socket $p^2$ in the side or cheek of the cradle $a$, which socket will be axially in line with the crank-shaft $d$ when the gun is in its forward position. The boss is retained in the socket with a capability of turning therein by means of a screw $p^*$, the point of which projects into a groove $p^{**}$, extending partially around the boss. The end of the shaft $d$ has a head or collar $d'$, across the outer surface of which is formed a groove or slot $d^2$, as shown in Fig. 13$^a$. The boss $p'$ is fitted with a spring-catch $q$, arranged to enter and fit the said groove $d^2$ and lock the hand-lever $p$ to the shaft $d$ when the gun is in firing position. Then the said shaft can be turned by hand to open and close the breech and fire the gun. It will be seen that when the catch $q$ and slot or groove $d^2$ are in line with each other in the direction of the movement of the gun in the cradle the endwise movement of the one relatively to the other will cause the groove to pass over from the catch. Therefore when the shaft $d$ is moved from the position shown in Fig. 9 in the recoil of the gun the said shaft will be disconnected from the hand-lever by the passing of the groove $d^2$ away from the catch. We provide the hand-lever $p$ with a handle or "quill" $p^3$, which is placed upon the end of the said lever and secured by a pivot-pin $p^4$, as shown in Fig. 10, whereon it will vibrate, the said quill being allowed a slight lateral movement or play upon the shank of the hand-lever. The quill $p^3$ is provided with a notch $p^5$, adapted to engage with a suitable projection $a^3$ on the gun frame or cradle, with which projection the quill is held in engagement by a spring $p^6$. By these or other suitable devices the hand-lever is held with the catch in the proper position to be engaged with or disengaged from the shaft; but by a slight movement of the hand against the force of the said spring the quill can be disengaged from the projection $a^3$ to permit the turning of the hand-lever.

The head or collar $d'$ has on it an incline $d^*$, Figs. 13$^a$ and 13$^b$, so that if the hand-lever catch should have been turned into an oblique position when the gun moves forward and the groove $d^2$ cannot pass over the said catch the said incline will force back the catch against the resistance of its spring, while the gun moves into a position in which by turning the hand-lever the catch can snap into the said groove.

In the apparatus illustrated in Figs. 9 to 13 the spring-catch $q$ and slot $d^2$ are so arranged relatively to the hand-lever that when the latter is in the position shown in Fig. 9 the said catch is in the slot and the breech is closed. Then by simply turning the hand-lever to the position shown in Fig. 11 the breech can be opened. In Figs. 12 and 13 we have shown the parts after recoil, the breech having been automatically opened and the catch $q$ pushed back by the incline $d^*$. In this case the hand-lever must first be turned to allow the catch to snap into the notch before the breech can be closed by means of the said hand-lever.

In the modification shown in Fig. 14, when the lever is in the same position as in Fig. 9 the breech is closed; but the spring-catch $q$, instead of being in the notch $d$, is lying across the same. Therefore the lever must first be turned into a position to cause the catch to enter the notch and then turned down to open the breech.

In some instances one or more springs are arranged, as shown in Figs. 1 and 24, in combination with the breech-block and crank-shaft to counterbalance the weight of the said breech-block. A casing $r$, pivoted at one end to the cradle, contains a spring $r^2$. One end of a rod $r^3$ is attached to the head or collar $d'$, forming part of the crank-shaft $d$, and the other end of the rod passes into the casing $r$ and is attached to the spring $r^2$, so that when the crank-shaft is rotated to lower the breech-block the rod $r^3$ is partially withdrawn from the casing $r$ and the spring $r^2$ is compressed. Energy is thereby stored up in the spring during the opening of the breech, which energy is available for effecting the closing of the breech when the crank-shaft is released or for assisting to close the breech.

In guns provided with a shoulder piece or crutch for enabling the gunner to control the movement of the gun in pointing or aiming the same an undue proportion of the weight of the gun is sometimes thrown upon the gunner by reason of the rapid change in the position of the center of gravity of the gun relatively to the trunnions or bearings in the recoil of the gun in its outer frame or cradle, whereby preponderance of the part of the gun in rear of the trunnions or bearings is considerably increased. To obviate this inconvenience, we provide a friction device or brake, whereby from the time the gun commences its recoil until it returns to the firing position the said brake will be automatically applied and will resist the turning of the gun and its slide or cradle about the trunnions or cradle and permit the same to be freely turned to effect the vertical pointing or elevation of the gun. This friction device or brake is clearly illustrated in Figs. 7 and 8.

$a$ is a part of the cradle. $ss'$ are two blocks fitted in a socket $t$ therein, as shown. $u\ u$ are springs arranged between the said blocks. The upper block $s$ is capable of vertical movement in the socket and supports a roller $v$, as shown. The lower block is formed with an arc-shaped bearing-piece $s^2$, having preferably taper sides and fitted in or between corresponding bearing-surfaces in the cross-head in which the gun and its slide or cradle are supported. When the gun is in the firing position, the roller $v$ rests within an inclined or curved recess $b^*$ in the body of the gun. When, however, the gun recoils, the inclined or curved surface on the rear side of the recess acts as a cam upon the said roller and forces it down with the block s against the resistance of the springs a, thus causing pressure and friction between the said arc-shaped taper bearing-surfaces and also between the trunnions, while allowing the gun to move freely in its recoil and return. The brake continues to act until the gun returns to its firing position, when the said roller again enters the recess in the gun and releases the pressure, so that the gun and cradle can be freely turned about the trunnions.

Our improved gun is provided with one or more suitable recoil-brakes and recuperators, and, if desired, with suitable elevating and training gear.

Our improved gun, as shown in the accompanying drawings, can be operated either automatically or by hand for opening the breech, and consequently cocking and firing the gun and extracting the empty cartridge-case. When operated automatically, we prefer that the breech should be opened in the running out of the gun to the firing position. For this purpose we provide a stop lever or pawl $w$, which is pivoted to the gun frame or cradle preferably below the gun, as shown at $w'$ in Fig. 1, and which is also illustrated in detail in Figs. 9, 11, 12, 13, 13$^a$, 13$^b$, and 14, and which is acted upon by spring or springs $w^2$, which tend constantly to force the lever or pawl upward, whereby as the gun returns the said pawl is caused to engage with the hooked end $d^3$ of the head or collar $d'$, fixed upon the crank $d$, and thus by the motion of the gun relatively to the pawl effects the turning of the said shaft $d$ about its axis to open the breech. The said head or collar $d'$ is provided with a projection or cam $d^4$, which when the collar has been rotated sufficiently to open the breech presses on the stop lever or pawl and disengages the same from the hook $d^3$, so that after the insertion of a fresh cartridge the block $c$ can be raised to close the breech.

We claim—

1. The combination, with the gun $b$ and the breech-block $c$, of a shaft $d$, supported in bearings in the body of the gun in rear of the breech-cavity, a crank arm or lever $e$, fixed on the shaft $d$, pins or projections $e'$ on the arm or lever $e$, straight grooves $f$ and circular grooves $f'$ for the projections $e'$ to work in, the latter grooves being so formed in the breech-block as to be concentric with the axis $d$ when the breech is closed and passing at their upper ends into straight grooves approximately parallel with the axis of the gun, so that when the breech-block is closed the pins $e'$ can be moved to rest in the angle formed by the curved and straight portions of the said grooves $f'$, all substantially as and for the purposes set forth.

2. The combination, with the gun $b$, the breech-block $c$, the arm or lever $e$ for operating the breech-block, and pins or projections $e'$ on the said arm or lever adapted to bear in a curved groove $f'$, formed in the breech-block when the breech is closed, of a cylindrical boss formed around the axis of the lever $e$, and a bearing-surface $g$, formed in the rear end of the gun and fitting closely to the said boss, as and for the purpose specified.

3. In a quick-firing gun, the firing mechanism comprising, in combination with each other, the firing-pin $h$, the firing-hammer $i$, the spring $k$, the trigger $l$, the lever $e$, having a pin or projection $e^3$ at its extremity, and the two sears $j\ j'$, one of which is fixed on the trigger-pivot and the other of which can turn on, but independently of, the trigger-pivot, and is formed with a projecting finger $j^*$, adapted to engage with the projection $e^3$, all substantially as and for the purpose described.

4. The combination, with the gun $b$ and the breech-block $c$, of an extractor $m$, formed in two similar parts, which are arranged symmetrically with respect to the breech of the gun and which are each provided with a hook or projection $m^2$, adapted to engage with notches $c^2$ on the breech-block $c$, as and for the purpose specified.

5. The combination, with the breech-block $c$, of projections $c^*$, formed thereon, and an extractor $m$, formed in two similar parts, each of which has a tail-piece $m'$ and a hook or projection $m^2$, the said tail-piece being acted upon by the projection $c^*$ when the breech-block descends, and the projection $m^2$, when the extractor is thrown back, entering notches $c^2$ in the breech-block to lock the same in the loading position, the said two similar parts of the extractor being independent of each other, substantially as described, for the purpose specified.

6. The combination, with the breech-block $c$, of the extractor $m$, having inclines $m^4$ formed at its lower extremities and arranged in combination with spring friction-pistons $m^3$, which engage with the said inclines $m^4$ when the breech is open, substantially as set forth, for the purpose specified.

7. The combination of the firing-hammer $i$, mounted on a pivot $i'$, the trigger $l$, a sear $j$, mounted loosely on the trigger-pivot and having a projecting finger $j^*$, a sear $j'$, fixed on the trigger-pivot, both sears being adapted to engage with a firing-hammer, and a crank-lever $e$, centered on a shaft $d$ in the breech and having a pin or projection $e^3$ at its extremity for engaging with the finger $j^*$ when the lever is raised, substantially as and for the purpose specified.

8. The combination of the sliding breech-block $c$, the firing-pin $h$, the firing-hammer $i$, the sear $j$, mounted loosely on the trigger-pivot and the sear $j'$ fixed thereon, the spring $k$ for operating the said sears, the trigger $l$, and the extractor $m$, consisting of two similar and symmetrically-arranged independent parts, all as set forth.

9. The combination, with the gun $b$, which moves to and fro in a frame or cradle $a$, of a hand-lever $p$, having a boss $p'$ mounted to turn in a bearing $p^2$ in the cradle $a$ and which is coupled to the breech-block-actuating crank-shaft $d$ when the gun is in the firing position, substantially as set forth.

10. The combination, with the cradle $a$, the gun $b$, mounted to slide therein, and the crank-shaft $d$, that operates the breech-block, of a hand-lever $p$, having its boss $p'$ fitted in a socket $p^2$ in the said cradle, a spring-catch $q$, the head $d'$ of the crank-shaft $d$, and a groove $d^2$, formed in the said head, all substantially as and for the purpose above described.

11. The combination, with the cradle $a$, the gun mounted to slide therein, and crank-shaft $d$, that operates the breech-block, of a hand-lever $p$, having its boss $p'$ fitted in a socket $p^2$ in the cradle $a$, a spring-catch $q$, the head $d'$ of the crank-shaft $d$, a groove $d^2$, formed in the said head, and an inclined surface $d^*$, formed on the said head, substantially as and for the purpose described.

12. The combination of the breech crank-shaft $d$, the hand-lever $p$, which engages with the said crank-shaft when the gun is in the firing position, the pivoted quill $p^3$, notch $p^5$, spring $p^6$, and the projection $a^3$ on the cradle, with which the quill $p^3$ is actuated to engage, all substantially as set forth.

13. The combination, with the crank-shaft $d$, short arm $d^3$ thereon, and a projection or cam $d^4$, formed on the said arm, of the spring-pawl $w$, pivoted to the gear-cradle $a$ and adapted to engage with the arm $d^3$, as and for the purpose set forth.

14. The combination, with the cradle $a$ and gun $b$, mounted to slide therein, of the recess $b^*$, formed in the gun, a roller $v$, adapted to engage with the said recess when the gun is run out, a block $s$, carrying the said roller, and another block $s'$ beneath the block $s$, the said block $s'$ having a tapered arc-shaped projection $s^2$, the cross-head B, in which is formed a groove adapted to engage with the projection $s^2$, and a spring or springs between the blocks $s$ $s'$ to force the same apart, all substantially as set forth.

15. The combination of the breech-block $c$, the inclined ribs $c'$, formed thereon, the said ribs having their rearward faces slightly undercut, the inclined grooves in the breech of the gun, in which the ribs of the breech-block fit, the said grooves having a cross-section corresponding to that of the ribs, substantially as described.

16. The combination of the block $c$, the pivot-pins $j^2$ $i'$ for the sears and firing-hammer, respectively, mounted therein, an arm $j^6$, mounted on the pin $j^2$ and projecting over the end of the pin $i'$, thereby retaining the said pin in position, as set forth.

17. The combination of the breech-block $c$, the notched or grooved pivot-pin $j^2$, the sear $j$, loosely mounted on the said pivot-pin, the link $j^5$, pivoted to the said sear and having a heel or tail piece engaging with the said notch or groove in the pivot-pin to retain the said pivot-pin in position, but which heel or tail piece can be turned out of engagement with the said notch or groove to permit of the withdrawal of the pivot-pin $j^2$, substantially as described.

18. The combination, with the pivot-pins $j^2$ $i'$, of an arm $j^6$, mounted on the pivot-pin $j^2$ and which projects normally over the end of the pivot-pin $i'$ to retain the said pin $i'$ in position, but which can be turned to allow of the withdrawal of the pin $i'$, substantially as described.

19. The combination, with a quick-firing gun $b$, mounted to slide in a trunnioned cradle $a$, carried by a cross-head B, of a breech-block $c$, formed with straight and curved grooves $f$ $f'$, a lever $e$, mounted on a shaft $d$ in the body of the gun and adapted to actuate the breech-block and having projections $e'$ working in the said grooves $f$ $f'$, a hand-lever $p$, mounted in the cradle $a$ and provided with a spring-catch $q$, a notch $d^2$ in the head of the shaft $d$, constructed and arranged to engage with the said spring-catch, a brake apparatus comprising a roller $v$, mounted in the upper one $s$ of two bearing-blocks $s$ $s'$, which have between them a spring or springs $u$, the lower of which blocks bears upon the cross-head B in order to check the tilting of the gun after it is fired, and a recess $b^*$, formed in the body of the gun and which receives the roller $v$ when the gun is run out to the firing position, substantially as described, and illustrated in the drawings.

In testimony whereof we have hereunto signed our names in the presence of two subscribing witnesses.

FRANCIS EDWARD DYKE ACLAND.
CARL HOLMSTRÖM.

Witnesses:
GEORGE HARRISON,
A. H. SLEATH.